(12) United States Patent
Bjarnason

(10) Patent No.: US 6,795,547 B1
(45) Date of Patent: Sep. 21, 2004

(54) FULL DUPLEX SPEAKER-PHONE PROVIDING INCREASED LOOP STABILITY

(75) Inventor: Elias Bjarnason, Reykjavik (IS)

(73) Assignee: Conexant Systems, Inc., Newport Beach, CA (US)

(*) Notice: Subject to any disclaimer, the term of this patent is extended or adjusted under 35 U.S.C. 154(b) by 670 days.

(21) Appl. No.: 09/630,845

(22) Filed: Aug. 2, 2000

(51) Int. Cl.$^7$ ............................................... H04M 1/00
(52) U.S. Cl. ........................... 379/390.03; 379/387.02; 379/388.05; 379/390.01; 379/390.02; 379/420.02
(58) Field of Search .................................. 379/406, 387, 379/388, 389, 390, 395, 419, 420, 406.01, 406.07, 406.08, 406.12, 387.02, 388.05, 390.01, 390.02, 420.02

(56) References Cited

U.S. PATENT DOCUMENTS 5,471,528 A * 11/1995 Reesor .................. 379/406.08
6,212,273 B1 * 4/2001 Hemkumar et al. ... 379/406.08
6,282,176 B1 * 8/2001 Hemkumar ................ 370/276

* cited by examiner

*Primary Examiner*—Curtis Kuntz
*Assistant Examiner*—Tuan Pham
(74) *Attorney, Agent, or Firm*—Christopher J. Rourk; Godwin Gruber, L.L.P.

(57) ABSTRACT

A full duplex speaker-phone that performs adaptive filtering to provide increased loop stability between users of the speaker-phone. The invention employs a sliding filter that performs adaptive frequency dependent attenuation of the speech signals within a speaker-phone. By detecting the mode of operation of the speaker-phone in real time, the speaker-phone performs adaptive filtering to ensure a high perceptual quality for the users of the speaker-phone. The sliding filtering is performed using a sliding low pass filter (LPF) in certain embodiments of the invention. Perceptually, the speaker-phone does not surrender the appearance of a full duplex speaker-phone from the perspective of the users. In addition, by performing frequency dependent filtering of the speech signals, the speaker-phone offers improved stability in the speaker-phone loop and reduces residual echoes significantly over conventional technology employed in speaker-phones. The sliding filter built in accordance with the present invention is easily implemented, having computational load and memory requirements that are negligible when compared with traditional systems that try to perform filtering in speaker-phones. In certain embodiments of the invention, the attenuation of the speech signals within the speaker-phone are concentrated at higher frequencies.

19 Claims, 8 Drawing Sheets

FULL DUPLEX SPEAKER-PHONE PROVIDING INCREASED LOOP STABILITY

BACKGROUND

1. Technical Field

The present invention relates generally to speaker-phones; and, more particularly, it relates to full duplex speaker-phone technology targeted to reduce loop instability.

2. Related Art

Conventional speaker-phone technology suffers tremendously from instability in the loop formed between the two ends of the speaker-phone. For example, in a fully duplex speaker-phone, whether analog or digital, the loop stability is not guaranteed even though the loop estimation is typically well below the predetermined limit for the loop. One reason that generates this deleterious effect of loop instability within conventional speaker-phones is the low path gain estimations and high gain estimations of any echo cancellers employed within the speaker-phone loop. For example, because the energy of speech is typically concentrated within the relatively low frequency range (i.e., below 1 kHz), the gain estimations are commonly only valid within that spectral range where the energy of the speech is in fact concentrated. In the specific case where the energy spectral density of the speech provided to the speaker-phone is in fact concentrated below the frequency range of approximately 1 kHz, then the gain estimations are valid and operable. However, when the characteristics of the speech signal are such that the energy spectral density is significantly contained above this conventional cutoff of approximately 1 kHz, then the gain estimations are typically invalid leading to undesirable reduced quality in operation of the speaker-phone.

In addition, the mathematical methods employed in the echo cancellers converge much quicker in the lower frequency ranges than in the higher frequency ranges. This is largely because there is very little excitation within the higher frequency ranges of the speech signal. Other portions of conventional speaker-phones suffer from the lack of excitation within the higher frequency ranges of the speech signal. For example, an acoustic echo canceller will typically be unable to track the changes in the acoustic environment at the ends of the speaker-phone that are often unavoidable and inevitable. This inability is largely traceable to the lack of excitation within the higher frequency portion of the speech signal. Perceptually, the effects of these combined deficiencies within conventional speaker-phones will result in instability in the loop of the speaker-phone, and an undesirable effect is fact that there is typically an increased audibility of echoes, specifically at these higher frequencies.

Many conventional methods try to employ a certain degree of attenuation of the various paths of the speaker-phone during the different modes of operation. For example, one conventional method increased the attenuation in the non-active path during single talk by a predetermined amount, such as 20 dB. In this mode, the speaker-phone is practically running at half-duplex. During a double talk mode of operation, the attenuation of the speaker-phone is divided in a certain way between the two paths of the speaker-phone. Typically, the attenuation is only around 6 dB in the receive path and the remainder of the attenuation is applied to the transmit path. However, these conventional methods suffer greatly in overall perceptual quality, in that, double talk detectors are typically highly unreliable and the resultant speech is often choppy or not even heard at all. For the two-band solutions that are used, an echo canceller is typically run in the lower band, and the upper band is run at half-duplex. In addition, for the multi-band (or polyphase) solutions that are used, a large lag is introduced into the system thereby compromising the perceptual quality of the speech signals within the speaker-phone.

Further limitations and disadvantages of conventional and traditional systems will become apparent to one of skill in the art through comparison of such systems with the present invention as set forth in the remainder of the present application with reference to the drawings.

SUMMARY OF THE INVENTION

Various aspects of the present invention can be found in a speaker-phone that performs adaptive filtering on a speech signal. The speech signal is partitioned into a first speech signal corresponding to a first user and a second speech signal corresponding to a second user. The speaker-phone itself includes a main control circuitry, a transmit circuitry, a receive circuitry, and a mode detection circuitry. The transmit circuitry includes a first adaptive frequency dependent attenuation circuitry to performs adaptive filtering on the first speech signal using a first attenuation parameter. The receive circuitry includes a second adaptive frequency dependent attenuation circuitry to perform adaptive filtering on the second speech using a second attenuation parameter. The mode detection circuitry detects an operation mode of the speaker-phone from among a number of operation modes. The number of operation modes includes a receive mode, a double talk mode, a transmit mode, and a silence mode. The main control circuitry operates cooperatively with the mode detection circuitry to adjust the first attenuation parameter and the second attenuation parameter based on the operation mode of the speaker-phone.

In certain embodiments of the invention, the speaker-phone also includes a real time modification circuitry that operates cooperatively with the main control circuitry and the mode detection circuitry to adjust the first attenuation parameter and the second attenuation parameter in real time. The real time modification circuitry includes a number of sliding coefficient sets. The first attenuation parameter and the second attenuation parameter are selected from the number of sliding coefficient sets. The selections of the first attenuation parameter and the second attenuation parameter are based, at least in part, on a characteristic of the first speech signal and a characteristic of the second speech signal. The first adaptive frequency dependent attenuation circuitry adjusts the first attenuation parameter to a minimum predetermined value and the second adaptive frequency dependent attenuation circuitry adjusts the second attenuation parameter to a maximum predetermined value.

A sum of the first attenuation parameter and the second attenuation parameter exceeds a predetermined threshold. The speaker-phone also includes a real time modification circuitry that is communicatively coupled to the first adaptive frequency dependent attenuation circuitry and the second adaptive frequency dependent attenuation circuitry. The real time modification circuitry includes a plurality of sliding coefficient sets. The speaker-phone also includes a programmable sliding low pass filter that is communicatively coupled to the first adaptive frequency dependent attenuation circuitry and the second adaptive frequency dependent attenuation circuitry such that the first attenuation parameter and the second attenuation parameter are selected from the number of sliding coefficient sets. The real time modification circuitry exchanges a third attenuation parameter for the first attenuation parameter and exchanges a fourth attenuation parameter for the second attenuation parameter in real time. The speaker-phone also includes a double talk detection circuitry that is operable to detect the double talk mode.

Other aspects of the present invention can be found in a speaker-phone that performs adaptive filtering on a speech signal. The speaker-phone includes a main control circuitry, and an adaptive frequency dependent attenuation circuitry communicatively coupled to the main control circuitry that operatives cooperatively with the main control circuitry to perform adaptive filtering on the speech signal using an attenuation parameter.

In certain embodiments of the invention, the speaker-phone includes a real time modification circuitry that contains a number of sliding filter coefficient sets, and the main control circuitry is operable to select at least one of the number of sliding filter coefficient sets based on a characteristic of the speech signal. The main control circuitry uses information provided by the mode detection circuitry to adjust the adaptive filtering performed by the adaptive frequency dependent attenuation circuitry. If desired, the speaker-phone is a full band analog speaker-phone having a line echo canceller. The speaker-phone includes a transmit circuitry and a receive circuitry, and the adaptive frequency dependent attenuation circuitry is distributed, at least in part, between the transmit circuitry and the receive circuitry. The speaker-phone includes a double talk detection circuitry that detects when at least two users of the speaker-phone are speaking, and the main control circuitry uses information provided by the double talk detection circuitry to perform an attenuation of the adaptive filtering that is performed by the adaptive frequency dependent attenuation circuitry in a predetermined manner.

In addition, the adaptive frequency dependent attenuation circuitry performs adaptive filtering on the speech signal using the attenuation parameter and at least one additional attenuation parameter, and the main control circuitry uses information provided by the double talk detection circuitry to modify the attenuation parameter by a constant fraction and to modify the at least one additional attenuation parameter by at least one additional constant fraction. If desired, the constant fraction and the at least one additional constant fraction are the same constant fraction.

Other aspects of the present invention can be found in a method to perform adaptive frequency dependent attenuation on a speech signal in a speaker-phone. The method involves detecting an operation mode of the speaker-phone from among a number of operation modes. Examples of operation modes include a receive mode, a double talk mode, a transmit mode, and a silence mode. The method also includes identifying an attenuation parameter that is used to perform adaptive filtering on the speech signal, determining whether the attenuation parameter has reached a maximum or a minimum, and modifying the attenuation parameter when the attenuation parameter has not reached at a maximum or a minimum.

In certain embodiments of the invention, the method also includes identifying another attenuation parameter that is used to perform adaptive filtering on the speech signal, and adjusting the attenuation parameter to a minimum value and the other attenuation parameter to a maximum value based on the detected operation mode of the speaker-phone. The method includes increasing the attenuation parameter by a fraction at a selected interval. The method is operable to be performed in a full band digital speaker-phone and in a full band analog speaker-phone.

Other aspects, advantages and novel features of the present invention will become apparent from the following detailed description of the invention when considered in conjunction with the accompanying drawings.

BRIEF DESCRIPTION OF THE DRAWINGS

A better understanding of the present invention can be obtained when the following detailed description of various exemplary embodiments are considered in conjunction with the following drawings.

DETAILED DESCRIPTION OF THE INVENTION

The invention employs sliding filtering to accommodate the various modes of operation in a speaker-phone while ensuring a high perceptual quality of the sound and speech provided at both ends of the loop of the speaker-phone. The sliding filtering, applied using adaptive frequency dependent attenuation in various embodiments of the invention, provides improved stability in the speaker-phone loop at considerably reduces residual echoes when compared to the conventional methods and systems that try to provide increased perceptual quality to the speech signals within speaker-phones. The sliding filtering allows for whole band attenuation scaling of the speech signals contained within the entire frequency spectrum that the speech signals occupy.

Figure 1:
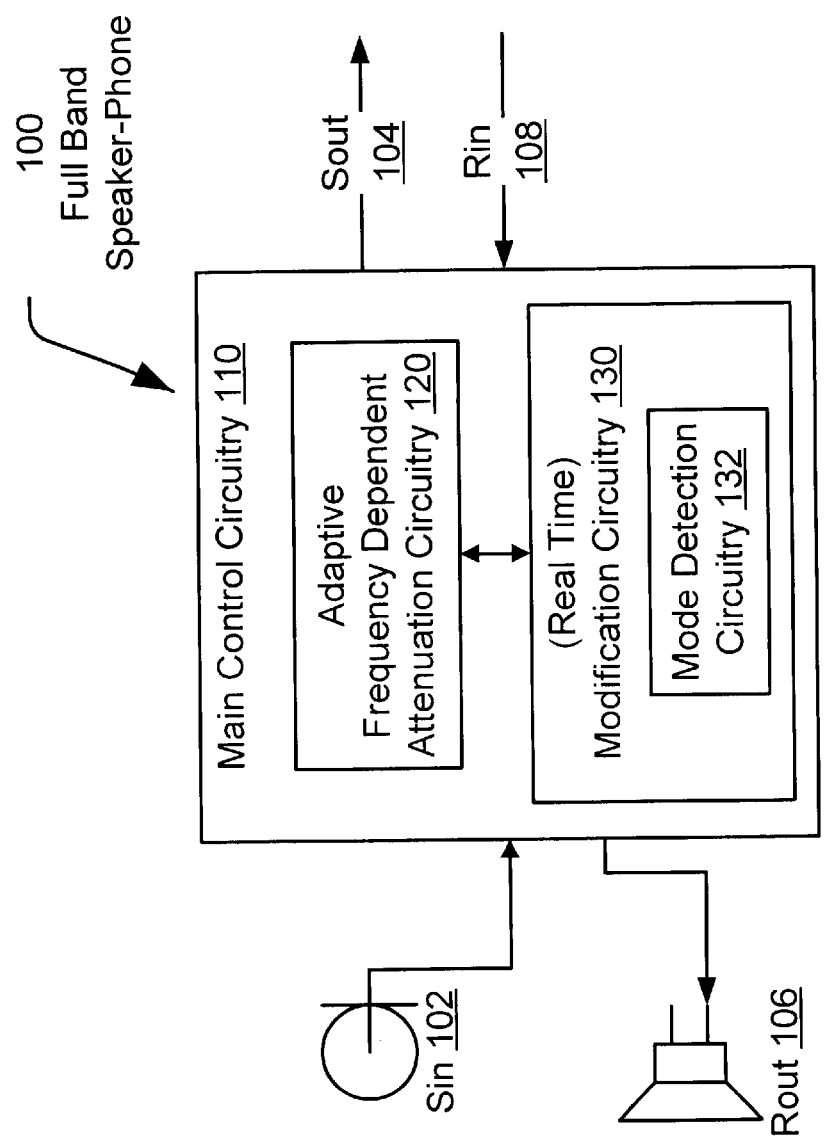
FIG. 1 is a system diagram illustrating an embodiment of a full band speaker-phone built in accordance with the present invention.

FIG. 1 is a system diagram illustrating an embodiment of a full band speaker-phone 100 built in accordance with the present invention. The full band speaker-phone 100 employs a main control circuitry 110. An input speech signal is provided to the main control circuitry 110 from a microphone Sin 102. After the speech signal is processed within the main control circuitry 110, the signal is emitted as shown by the output signal Sout 104 where it is transferred across a communication link that is part of the total telephone system to another telephone that is also part of the total telephone system. An input signal Rin 108 is received across the communication link from the other telephone. After the input signal is processed within the main control circuitry 110, the signal is emitted as an output signal as shown by the output speaker Rout 106. The main control circuitry 110 contains, among other things, an adaptive frequency dependent attenuation circuitry 120 and a (real time) modification circuitry 130. The (real time) modification circuitry 130 performs mode identification using a mode detection circuitry 132.

The mode detected by the mode detection circuitry 132 is any number of modes including a receive mode, a double talk mode, a transmit mode, and a silence mode as will be seen in the various embodiments of the invention shown below. The adaptive frequency dependent attenuation circuitry 120 selects any of a predetermined number of types of filtering on the microphone signal Sin 102 and the input signal Rin 108 depending on which modes is selected in the various embodiments of the invention in conjunction with the (real time) modification circuitry 130. For example, even during a single telephone conversation, the (real time) modification circuitry 130 and the adaptive frequency dependent attenuation circuitry 120 are operable, in conjunction, to change the filtering that is performed on the microphone signal Sin to 102 and the input signal Rin 108 to maintain a high perceptual quality of sound of the various signals for the users of the full band speaker-phone 100.

Figure 2:
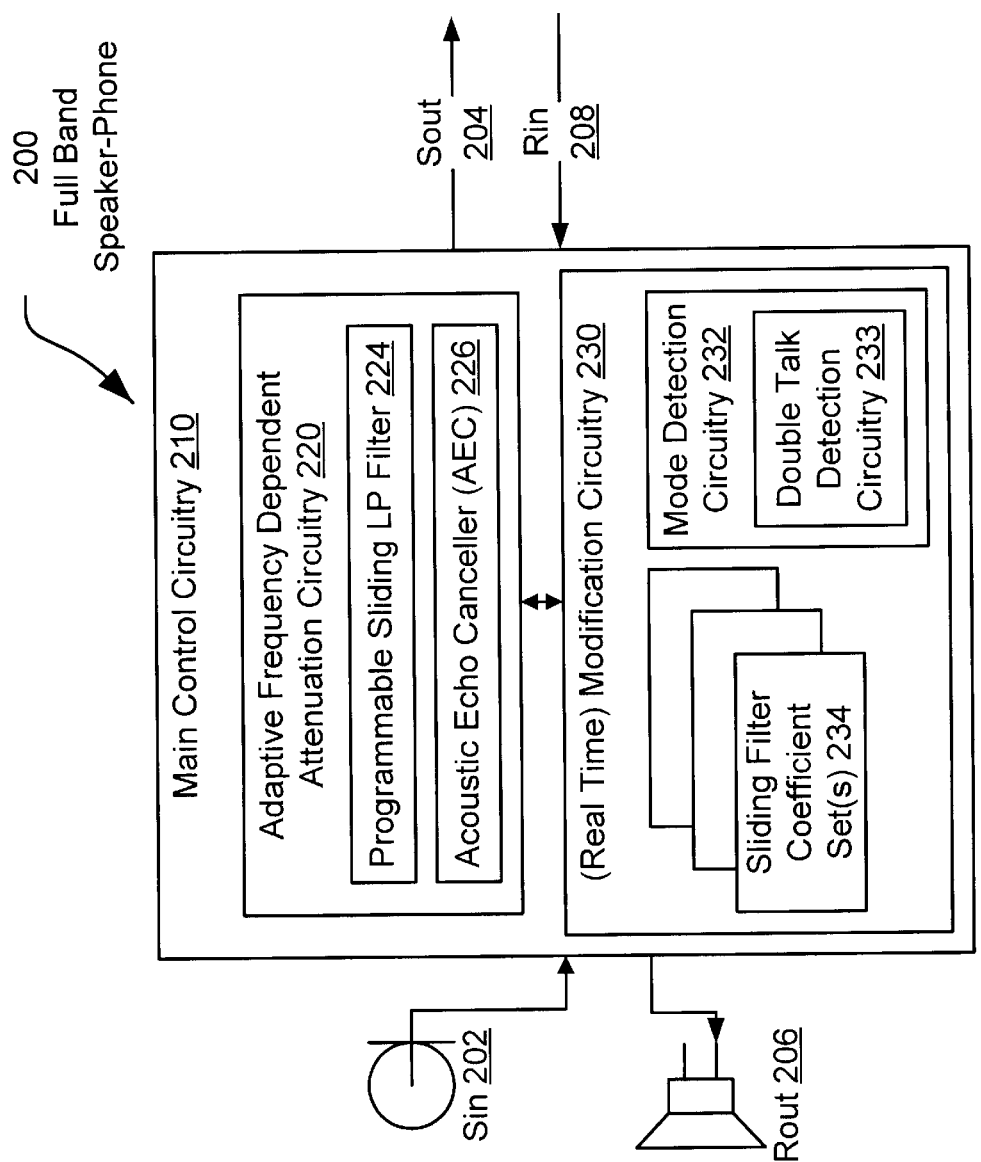
FIG. 2 is a system diagram illustrating another embodiment of a full band speaker-phone built in accordance with the present invention.

FIG. 2 is a system diagram illustrating another embodiment of a full band speaker-phone 200 built in accordance with the present invention. The full band speaker-phone 200 employs a main control circuitry 210. An input speech signal is provided to the main control circuitry 210 from a microphone Sin 202. After the speech signal is processed within the main control circuitry 210, the signal is emitted as shown by the output signal Sout 204 where it is transferred across a communication link that is part of the total telephone system to another telephone that is also part of the total telephone system. An input signal Rin 208 is received across the communication link from the other telephone. After the input signal is processed within the main control circuitry 210, the signal is emitted as an output signal as shown by the output speaker Rout 206.

The main control circuitry 210 contains, among other things, an adaptive frequency dependent attenuation circuitry 220 and a (real time) modification circuitry 230. The (real time) modification circuitry 230 performs mode identification using a mode detection circuitry 232. The mode detection circuitry 232 is operable to perform double talk detection using a double talk detection circuitry 233. The adaptive frequency dependent attenuation circuitry 220 contains a programmable sliding low pass (LP) filter 224 and an acoustic echo canceller (AEC) 226. The programmable sliding low pass (LP) filter 224 is adaptable to load in various sliding filter coefficient sets from a number of sliding filter coefficient set(s) 234 contained within the (real time) modification circuitry 230. Depending upon the mode of detection in which the speaker-phone operates, the (real time) modification circuitry 230 provides a sliding filter coefficient set to the programmable sliding low pass (LP) filter 224 for better filtering of the various speech signals within that particular mode of operation. In addition, the double talk detection circuitry 233 is operable to perform double talk detection operation of the full band speaker-phone 200. In certain embodiments of the invention, when double talk is detected, the attenuation is divided between the receive path and the transmit path of the full band speaker-phone 200 in any number of desired manners. The division of the attenuation between the receive path and the transmit path is according to a selected, predetermined manner in certain embodiments of the invention and according to adaptive attenuation division in other embodiments of the invention.

Figure 3:
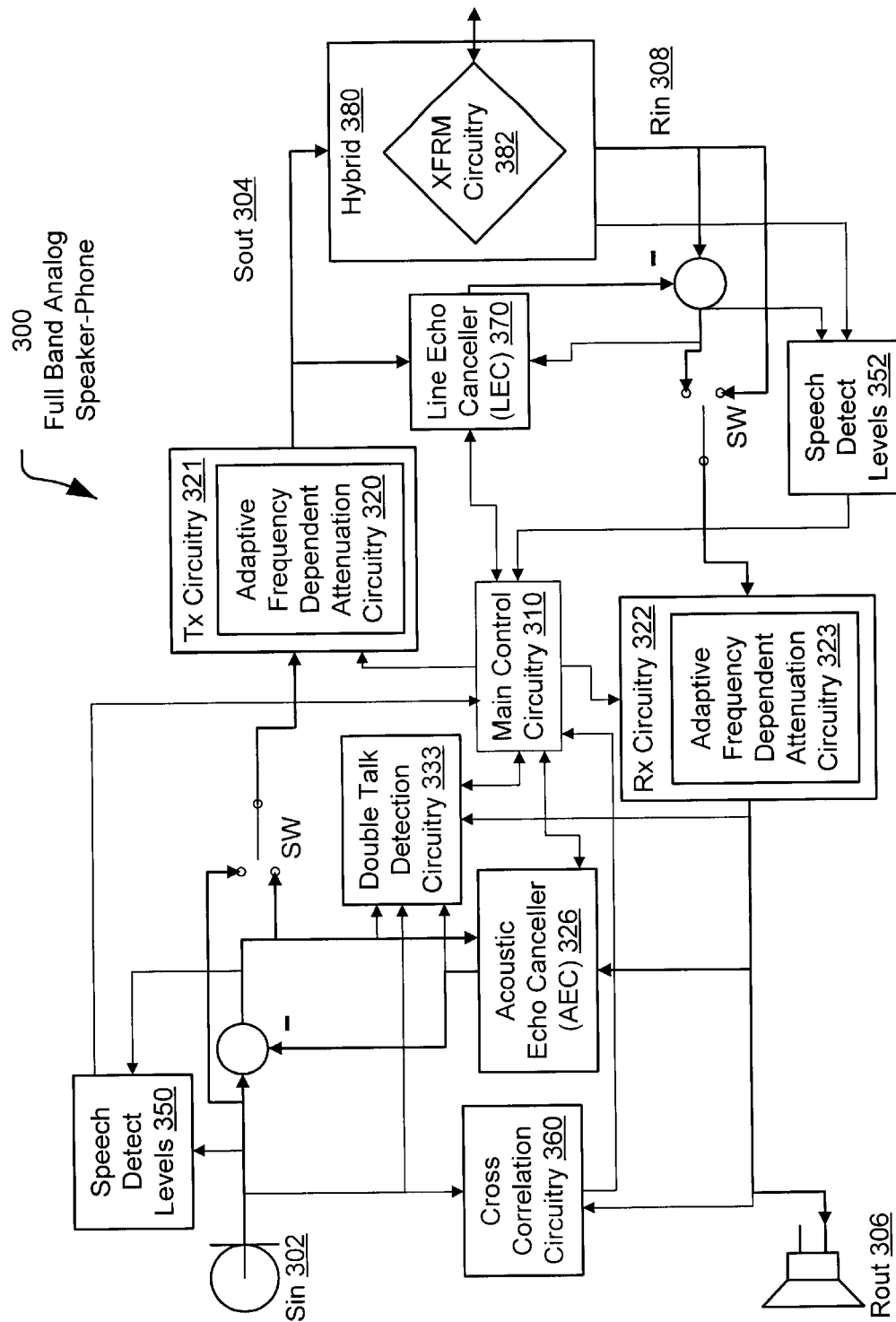
FIG. 3 is a system diagram illustrating an embodiment of a full band analog speaker-phone built in accordance with the present invention.

FIG. 3 is a system diagram illustrating an embodiment of a full band analog speaker-phone 300 built in accordance with the present invention. The full band analog speaker-phone 300 employs a main control circuitry 310. An input speech signal is provided from a microphone Sin 302. After the speech signal is processed within the full band analog speaker-phone 300, the signal is emitted as shown by the output signal Sout 304 where it is transferred across a communication link that is part of a total telephone system to another telephone that is also part of the total telephone system. An input signal Rin 308 is received across the communication link from the other telephone. After the input signal is processed within the full band analog speaker-phone 300, the signal is emitted as an output signal as shown by the output speaker Rout 306. A main control circuitry within the full band analog speaker-phone 300 controls virtually all of the interaction of the various circuitries to perform speaker-phone operation.

The speech signal provided from the microphone Sin 302 is fed to a summer that is followed by a switch and subsequently to a transmit (Tx) circuitry 321. Before the switch, the speech signal is also passed to an acoustic echo canceller (AEC) 326, and a measurement of it is passed to a cross correlation circuitry 360 and a double talk detection circuitry 333. The Tx circuitry 321 itself contains, among other things, an adaptive frequency dependent attenuation circuitry 320. Afterwards, the now-processed speech signal is passed to a hybrid 380. The hybrid 380 contains, among other things, a transformer (XFRM) circuitry 382. The XFRM circuitry 382 is operable inside the full band analog speaker-phone 300 to interface the to other analog circuitry that are operable at different voltage levels or at the same voltage level. The output from the Tx circuitry 321 is also fed to a line echo canceller (LEC) 371 as well.

The input signal Rin 308 is fed to a summer that is followed by a switch and subsequently to a receive Rx circuitry 322. The Rx circuitry 322 itself contains, among other things, an adaptive frequency dependent attenuation circuitry 323. Afterwards the input signal Rin 308, after being processed by the Rx circuitry 322, is passed to the output speaker Rout 306. In addition, the Rx processed input signal Rin 308 is passed to the acoustic echo canceller (AEC) 326, and a measurement of it is passed to the cross correlation circuitry 360 and the double talk detection circuitry 333.

In addition to the passing of the actual speech signals within the full band analog speaker-phone 300, certain measurements from those speech signals are also used in certain embodiments of the invention to control the signal processing within the full band analog speaker-phone 300, some of which have been mentioned above. For example, from the speech signal provided from the microphone Sin 302, speech detect levels 350 are measured for the speech signal. Similarly, for the speech signal received as the input signal Rin 308, speech detect levels 352 are measured for the speech signal. Both the speech detect levels 350 and the speech detect levels 352 are provided to the main control circuitry 310. The main control circuitry 310 also operates cooperatively with the cross correlation circuitry 360, the acoustic echo canceller (AEC) 326, the double talk detection circuitry 333, the Tx circuitry 321, the Rx circuitry 322, and the line echo canceller (LEC) 370 to provide the overall control of the full band analog speaker-phone 300. Various other signal and measurement paths are shown as illustrated in the FIG. 3. For example, the various switches, each one connected to its respective portion of the speech signals that are fed to the full band analog speaker-phone 300, are operable to be switched in or out depending on the mode of operation in which the full band analog speaker-phone 300 is operating or the specific level of sliding filtering that is to be performed.

The adaptive frequency dependent attenuation circuitry 320 within the Tx circuitry 321 and the adaptive frequency dependent attenuation circuitry 323 within the Rx circuitry 322 are each operable to perform sliding filtering in accordance with the present invention. For example, the various speech signal are filtered using a sliding filter to maintain a high perceptual quality for both ends of the full band analog speaker-phone 300. The specific implementation of the sliding filters permits increased loop stability in the overall operation of the full band analog speaker-phone 300. The sliding filtering is also adaptive, being operable to change in accordance with certain measurements taken within the full band analog speaker-phone 300, including the speech detect levels 350 and the speech detect levels 352.

For example, the speech detect levels 350 and the speech detect levels 352 that are provided to the main control circuitry 310 are used to perform decision-making about how to perform sliding filtering within the adaptive frequency dependent attenuation circuitry 320 within the Tx circuitry 321 and the adaptive frequency dependent attenuation circuitry 323 within the Rx circuitry 322. This is one such example of how the circuitries within the full band analog speaker-phone 300 all interact.

In similar fashion, when the input signal Rin 308, after being processed by the Rx circuitry 322, is provided to the acoustic echo canceller (AEC) 326, the main control circuitry 310 will use information provided by the cross correlation circuitry 360, the acoustic echo canceller (AEC) 326, the double talk detection circuitry 333, as well as information provided by the speech detect levels 350 and the speech detect levels 352, to control the overall operation of the full band analog speaker-phone 300. In addition, when the speech signal provided from the microphone Sin 302, after being processed by the Tx circuitry 321, is provided to the line echo canceller (LEC) 370, the main control circuitry 310 will similarly use information provided by the cross correlation circuitry 360, the acoustic echo canceller (AEC) 326, the double talk detection circuitry 333, as well as information provided by the speech detect levels 350 and the speech detect levels 352, to control the overall operation of the full band analog speaker-phone 300.

Figure 4:
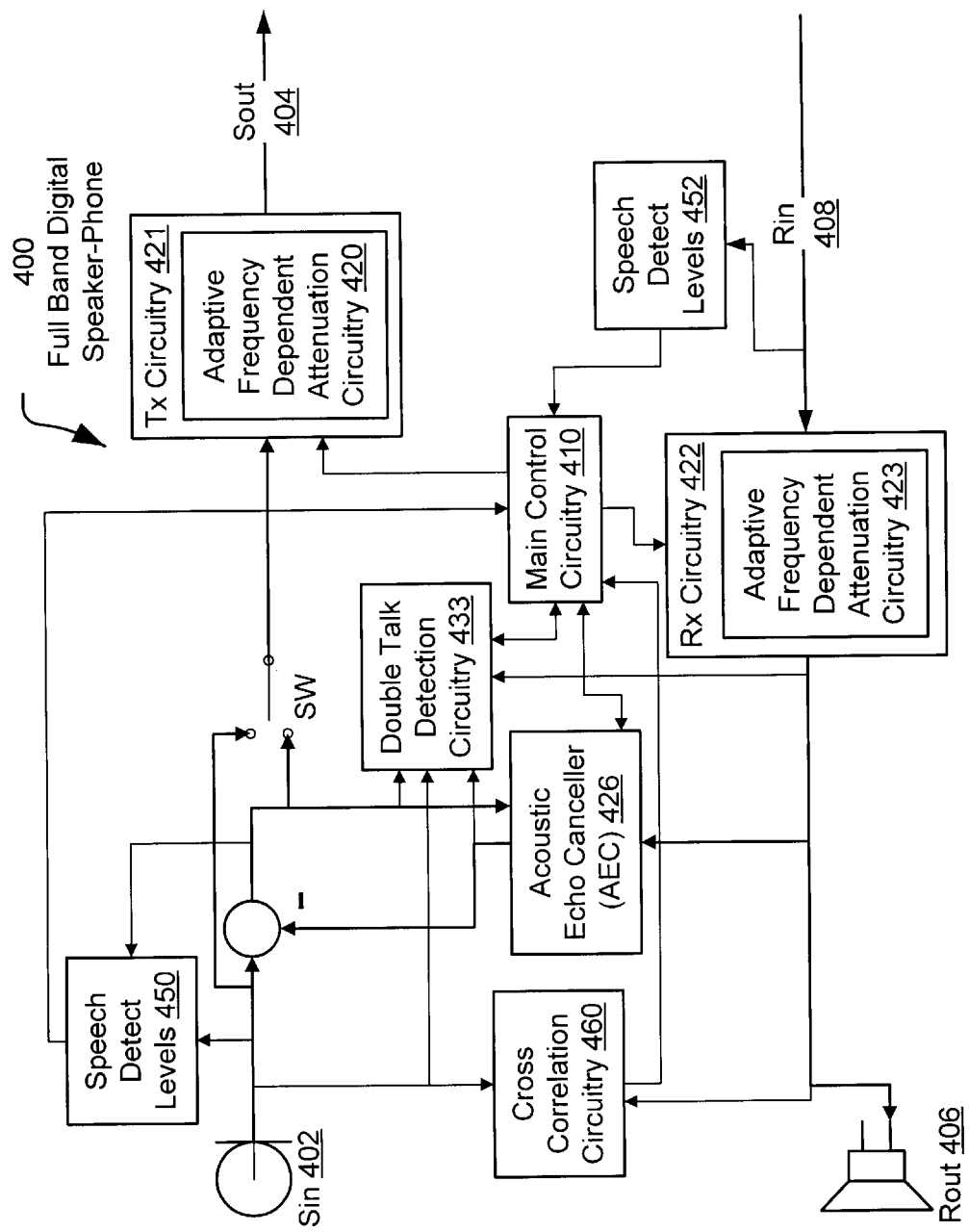
FIG. 4 is a system diagram illustrating an embodiment of a full band digital speaker-phone built in accordance with the present invention.

FIG. 4 is a system diagram illustrating an embodiment of a full band digital speaker-phone 400 built in accordance with the present invention. The full band digital speaker-phone 400 employs a main control circuitry 410. An input speech signal is provided from a microphone Sin 402. After the speech signal is processed within the full band digital speaker-phone 400, the signal is emitted as shown by the output signal Sout 404 where it is transferred across a communication link that is part of a total telephone system to another telephone that is also part of the total telephone system. An input signal Rin 408 is received across the communication link from the other telephone. After the input signal is processed within the full band digital speaker-phone 400, the signal is emitted as an output signal as shown by the output speaker Rout 406. A main control circuitry within the full band digital speaker-phone 400 controls virtually all of the interaction of the various circuitries to perform speaker-phone operation.

The speech signal provided from the microphone Sin 402 is fed to a summer that is followed by a switch and subsequently to a transmit (Tx) circuitry 421. The Tx circuitry 421 itself contains, among other things, an adaptive frequency dependent attenuation circuitry 420. Afterwards, the now-processed speech signal is transmitted to another telephone that is also part of the total telephone system as shown by the output signal Sout 404. The speech signal provided from the microphone Sin 402, before being passed to the Tx circuitry 421, is also passed to an acoustic echo canceller (AEC) 426, and a measurement of it is passed to a double talk detection circuitry 433 and a cross correlation circuitry 460 as well.

Similar to the Tx circuitry 421, the Rx circuitry 422 itself contains, among other things, an adaptive frequency dependent attenuation circuitry 423 to perform processing on the input signal Rin 408. The input signal Rin 408 that is received across the communication link from the other telephone is fed to the Rx circuitry 422 for processing, and afterwards, it is fed to the output speaker Rout 406. In addition, the Rx processed input signal Rin 408 is passed to the acoustic echo canceller (AEC) 426, and a measurement of it is passed to the cross correlation circuitry 460 and the double talk detection circuitry 433.

In addition to the passing of the actual speech signals within the full band digital speaker-phone 400, certain measurements from those speech signals are also used in certain embodiments of the invention to control the signal processing within the full band analog speaker-phone 400, some of which have been described. For example, from the speech signal provided from the microphone Sin 402, speech detect levels 450 are measured for the speech signal. Similarly, for the speech signal received as the input signal Rin 408, speech detect levels 452 are measured for the speech signal. Both the speech detect levels 450 and the speech detect levels 452 are provided to the main control circuitry 410. The main control circuitry 410 also operates cooperatively with the cross correlation circuitry 460, the acoustic echo canceller (AEC) 426, the double talk detection circuitry 433, the Tx circuitry 421, and the Rx circuitry 422 to provide the overall control of the full band digital speaker-phone 400. Various other signal and measurement paths are shown as illustrated in the FIG. 4. For example, the various switches, each one connected to its respective portion of the speech signals that are fed to the full band digital speaker-phone 400, are operable to be switched in or out depending on the mode of operation in which the full band digital speaker-phone 400 is operating or the specific level of sliding filtering that is to be performed.

The adaptive frequency dependent attenuation circuitry 420 within the Tx circuitry 421 and the adaptive frequency dependent attenuation circuitry 423 within the Rx circuitry 422 are each operable to perform sliding filtering in accordance with the present invention. For example, the various speech signal are filtering using a sliding filter to maintain a high perceptual quality for both ends of the full band digital speaker-phone 400. The specific implementation of the sliding filters permits increased loop stability in the overall operation of the full band digital speaker-phone 400. The sliding filtering is also adaptive, being operable to change in accordance with certain measurements taken within the full band digital speaker-phone 400, including the speech detect levels 450 and the speech detect levels 452.

For example, the speech detect levels 450 and the speech detect levels 452 that are provided to the main control circuitry 410 are used to perform decision-making about how to perform sliding filtering within the adaptive frequency dependent attenuation circuitry 420 within the Tx circuitry 421 and the adaptive frequency dependent attenuation circuitry 423 within the Rx circuitry 422. This is one such example of how the circuitries within the full band digital speaker-phone 400 all interact.

In similar fashion, when the input signal Rin 408, after being processed by the Rx circuitry 422, is provided to the acoustic echo canceller (AEC) 426, the main control circuitry 410 will use information provided by the cross correlation circuitry 460, the acoustic echo canceller (AEC) 426, the double talk detection circuitry 433, as well as information provided by the speech detect levels 450 and the speech detect levels 452, to control the overall operation of the full band digital speaker-phone 400. In addition, when the speech signal provided from the microphone Sin 402, after being processed by the Tx circuitry 421, the main control circuitry 410 will similarly use information provided by the cross correlation circuitry 460, the acoustic echo canceller (AEC) 426, the double talk detection circuitry 433, as well as information provided by the speech detect levels 450 and the speech detect levels 452, to control the overall operation of the full band digital speaker-phone 400.

In one embodiment of the invention, a first order recursive filtering is performed in the transmit path and the receive path of a speaker-phone built in accordance with the present invention. This filtering is operable within the adaptive frequency dependent attenuation circuitry 320 within the Tx circuitry 321 and the adaptive frequency dependent attenuation circuitry 323 within the Rx circuitry 322 within the FIG. 3, as well as within the adaptive frequency dependent attenuation circuitry 420 within the Tx circuitry 421 and the adaptive frequency dependent attenuation circuitry 423 within the Rx circuitry 422 within the FIG. 4, among other embodiments of the invention. The filtering is operable within the adaptive frequency dependent attenuation circuitry 120 of the FIG. 1 as well as within the adaptive frequency dependent attenuation circuitry 220 of the FIG. 2. The first order recursive filter is defined with the following equations:

$$r_{out}(n)=a_r \cdot r_{out}(n-1)+(1-a_r) \cdot Rx[r_{in}(n)]; 0 \leq a_r \leq 1,$$

$$s_{out}(n)=a_s \cdot s_{out}(n-1)+(1-a_s) \cdot Tx[s_{in}(n)]; 0 \leq a_s \leq 1.$$

Here Rx[ ], Tx[ ] define the whole band attenuation scaling in the receive path and the transmit path of the speaker-phone.

The transfer function of the sliding filter is given by $$|H(e^{j\Omega})|^2 = \frac{(1-a)^2}{1-2 \cdot a \cdot \cos(\Omega) + a^2}; 0 \leq \Omega \leq \pi.$$

It has zero attenuation in DC, but the attenuation in $\pi$ is given by $$|H(e^{j\pi})|^2 = \frac{(1-a)^2}{(1+a)^2}.$$

Now maximum and minimum values for $a_r$, $a_s$ are appropriately chosen. One particular manner of choosing them is shown below.

$$0 \leq a_{r_{min}} \leq a_r \leq a_{r_{max}} \leq 1$$

$$0 \leq a_{s_{min}} \leq a_s \leq a_{s_{max}} \leq 1$$

As described above, the speaker-phone is operable to perform operation in any number of modes, including a receive mode, a double talk mode, a transmit mode, and a silence mode. One particular manner in which to control the adaptive frequency dependent attenuation filtering of the invention is described below.

In the silence mode, the attenuation of the transmit path is reduced to a minimum but increase the attenuation of the receive path is increased to a maximum. In the receive mode, the attenuation of the receive path is reduced to its minimum whereas the attenuation of the transmit path is increased to its maximum. This will help in reducing the residual acoustic echoes but still suggest to the far-end user of the speaker-phone a full-duplex operation of the speaker-phone as undetected double talk will come through although attenuated in the higher frequency range.

In the transmit mode, the situation is reversed. If a double talk detector or double talk detection circuitry is available, then the attenuation is divided between the transmit and the receive path as desired by a user of the speaker-phone. The attenuation parameters are increased/decreased by a constant fraction that is subtracted/added to the attenuation parameters at constant intervals. This modification of the attenuation parameters is performed as fast as one likes to have it. The sum of attenuation of the transmit and receive sliding filters is kept relatively constant by requiring at all times that the sum of the attenuation should be greater or equal to some threshold, and an exception to this requirement is made during double-talk in certain embodiments of the invention.

$$a_r + a_s \geq a_{max}; 0 \leq a_{max} \leq 1.$$

Figure 5:
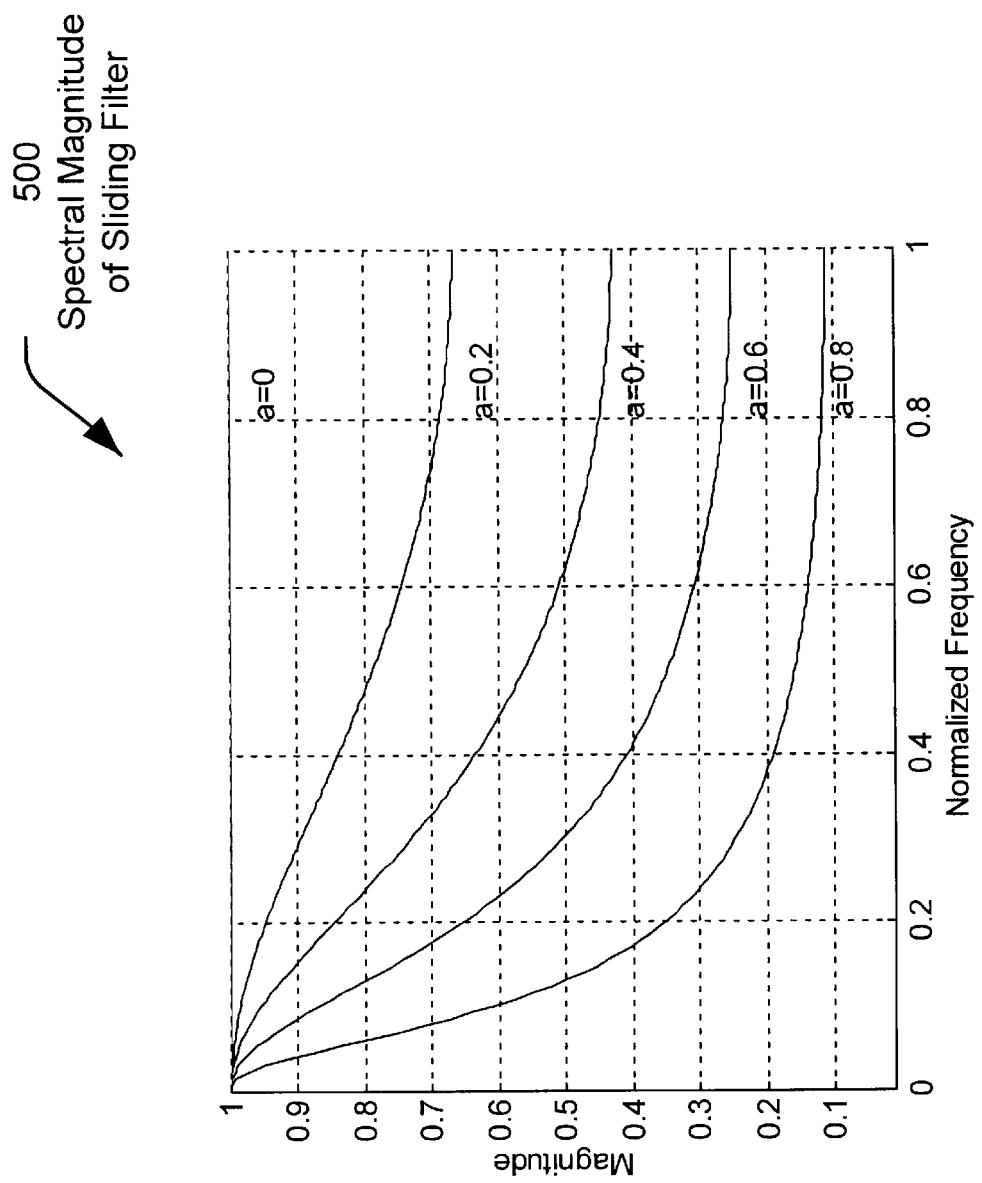
FIG. 5 is a spectral-magnitude diagram illustrating an embodiment of a spectral magnitude of a sliding filter built in accordance with the present invention.

FIG. 5 is a spectral-magnitude diagram illustrating an embodiment of a spectral magnitude 500 of a sliding filter built in accordance with the present invention. The FIG. 5 specifically illustrated one embodiment of the sliding filtering performed in any of the various embodiments of the invention. The FIG. 5 shows a normalized spectral magnitude of the sliding filter as a function of normalized frequency. In addition, several traces, each having a different attenuation parameter "a", are shown on the normalized spectral magnitude of the sliding filter as a function of the normalized frequency. The FIG. 5 is a graphical representation of the magnitude of the transfer function of the sliding filter described above.

Figure 6:
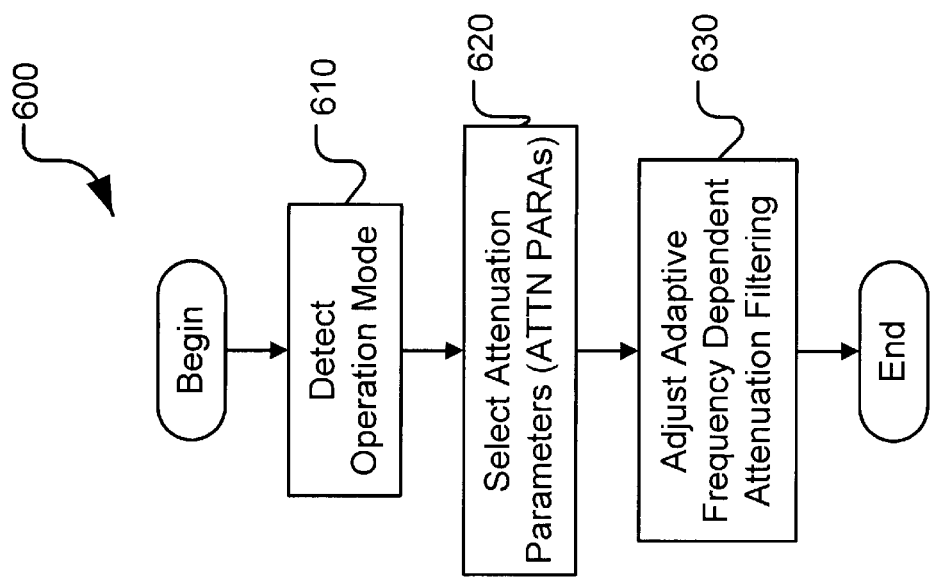
FIG. 6 is a functional block diagram illustrating a method that performs adaptive frequency dependent attenuation filtering in accordance with the present invention.

FIG. 6 is a functional block diagram illustrating a method 600 that performs adaptive frequency dependent attenuation filtering in accordance with the present invention. In a block 610, a mode of operation for a speaker-phone is detected. Then, in a block 620, attenuation parameters (ATTN PARAs) are selected to perform adaptive frequency dependent attenuation filtering within the method 600. Ultimately, in a block 630, the selected attenuation parameters (ATTN PARAs) are adjusted depending on the mode of operation of the speaker-phone. If desired, as the mode of operation of the speaker-phone changes, then the selected attenuation parameters (ATTN PARAs) are adjusted to accommodate better the new operational mode.

Figure 7:
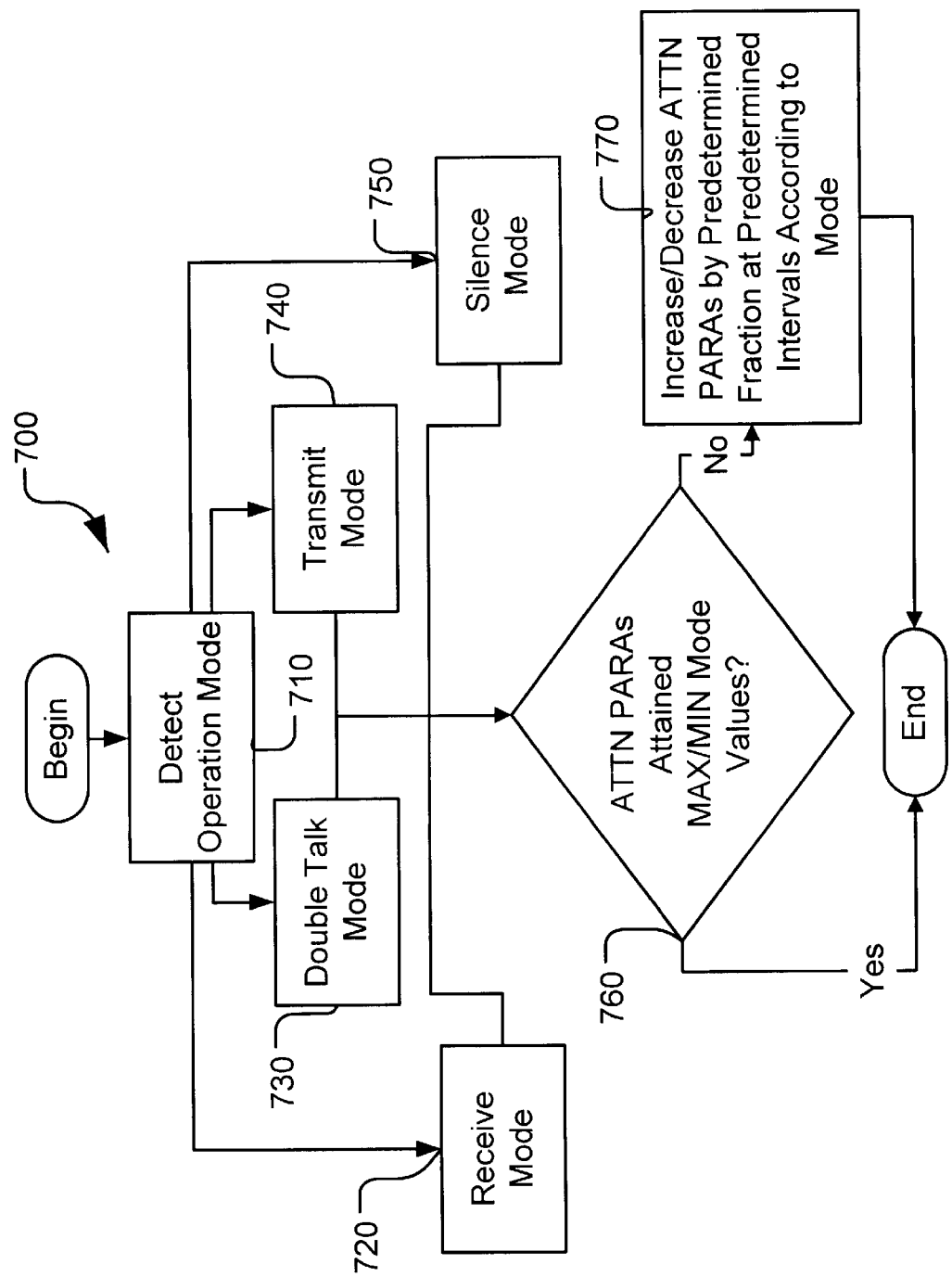
FIG. 7 is a functional block diagram illustrating another method that performs adaptive frequency dependent attenuation filtering in accordance with the present invention.

FIG. 7 is a functional block diagram illustrating another method 700 that performs adaptive frequency dependent attenuation filtering in accordance with the present invention. In a block 710, a mode of operation for a speaker-phone is detected. Then, the method 700 proceeds in one of several directions, depending on the mode of operation that was detected in the block 710. For example, the method 700 proceeds to a block 720 when a receive mode is detected in the block 710. The method 700 proceeds to a block 730 when a double talk mode is detected in the block 710; the method 700 proceeds to a block 740 when a transmit mode is detected in the block 710; the method 700 proceeds to a block 750 when a silence mode is detected in the block 710.

For each of the modes of operation of the speaker-phone, as detected in the block 710, and as appropriately followed through with in the blocks 720, 730, 740, and 750, the method 700 then proceeds in a decision block 760 to determine if attenuation parameters (ATTN PARAs) have attained maximum/minimum (MAX/MIN) values for the specific mode of operation. If the attenuation parameters (ATTN PARAs) have not attained the maximum/minimum (MAX/MIN) values for the specific mode of operation, then the attenuation parameters (ATTN PARAs) are increased/decreased by a predetermined fraction at predetermined intervals according to the mode of operation that is detected in the block 710. Alternatively, if the attenuation parameters (ATTN PARAs) have attained the maximum/minimum (MAX/MIN) values for the specific mode of operation, then the method 700 ends. The modification of the attenuation parameters (ATTN PARAs) is performed using any of the embodiments of the invention described above in any of the various Figures and Equations.

Figure 8:
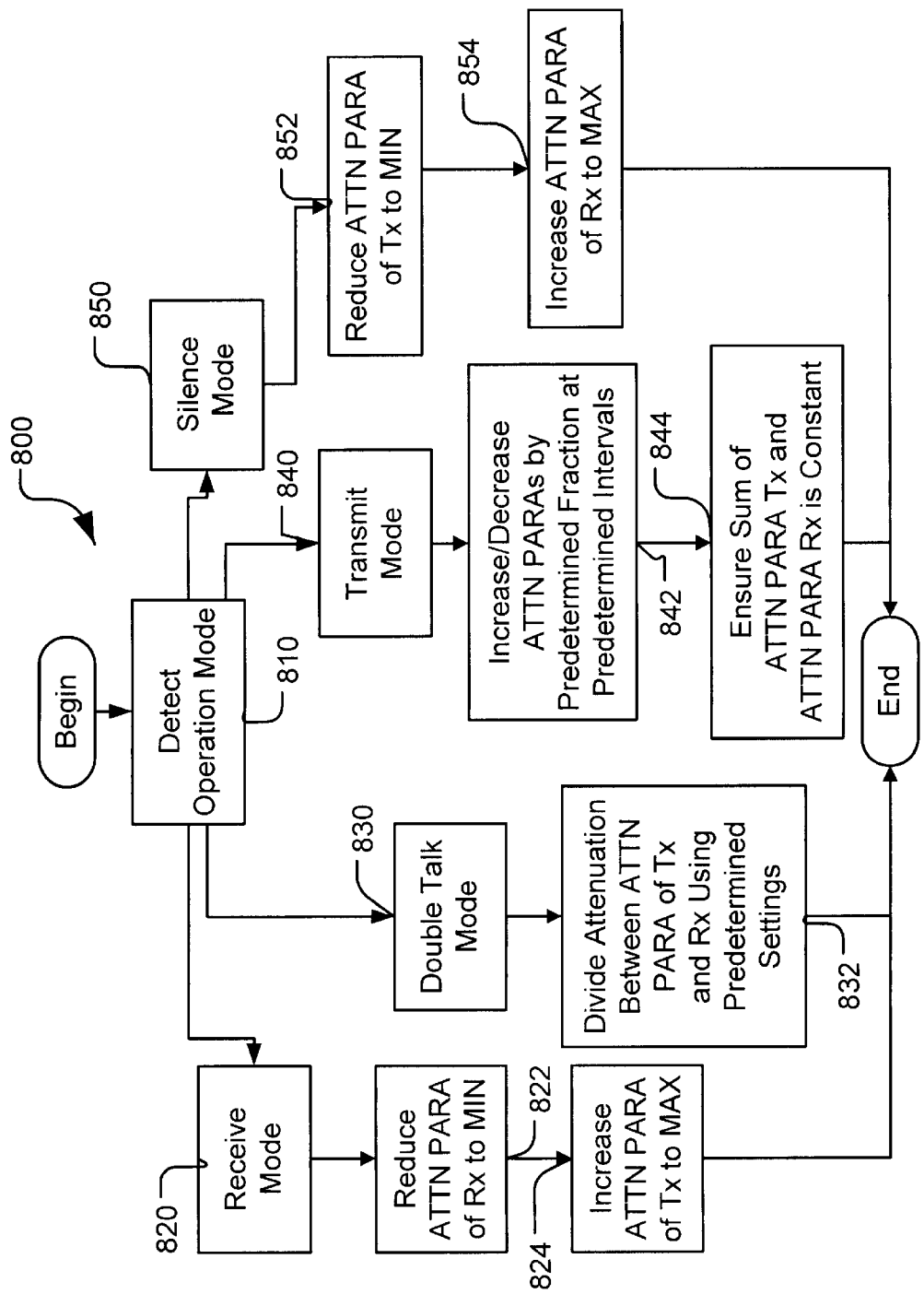
FIG. 8 is a functional block diagram illustrating a method that is a specific embodiment of the method illustrated in the FIG. 7.

FIG. 8 is a functional block diagram illustrating a method 800 that is a specific embodiment of the method 700 illustrated in the FIG. 7. In a block 810, a mode of operation for a speaker-phone is detected. Then, the method 800 proceeds in one of several directions, depending on the mode of operation that was detected in the block 810. For example, the method 800 proceeds to a block 820 when a receive mode is detected in the block 810. The method 800 proceeds to a block 830 when a double talk mode is detected in the block 810; the method 800 proceeds to a block 840 when a transmit mode is detected in the block 810; the method 800 proceeds to a block 850 when a silence mode is detected in the block 810.

When the receive mode is detected, and following the block 820, the method 800 proceeds to reduce the attenuation parameter (ATTN PARA) of the receive path Rx of the speaker-phone to its minimum in a block 822. Then, the method 800 proceeds to increase the attenuation parameter (ATTN PARA) of the transmit path Tx of the speaker-phone to its minimum in a block 824. Then the method 800 terminates, and the method 800 is operable to performed many times in sequence to detect another mode of operation if desired.

When the double talk mode is detected, and following the block 830, the method 800 proceeds to divide the attenuation parameters (ATTN PARAs) between the receive path Rx and the transmit Tx path of the speaker-phone in a block 832. Then the method 800 terminates, and as mentioned above, the method 800 is operable to performed many times in sequence to detect another mode of operation if desired.

When the transmit mode is detected, and following the block 840, the method 800 proceeds to increase/decrease the attenuation parameters (ATTN PARAs) by a predetermined fraction at predetermined intervals in a block 842. Then, the method 800 proceeds to ensure that the sum of the transmit path Tx attenuation parameter (ATTN PARA) and the receive path Rx attenuation parameter (ATTN PARA) is constant in a block 844. Then the method 800 terminates, and as mentioned above, the method 800 is operable to performed many times in sequence to detect another mode of operation if desired.

When the silence mode is detected, and following the block 850, the method 800 proceeds to reduce the attenuation parameter (ATTN PARA) of the transmit path Tx of the speaker-phone to its minimum in a block 852. Then, the method 800 proceeds to increase the attenuation parameter (ATTN PARA) of the receive path Rx of the speaker-phone to its minimum in a block 854. Then the method 800 terminates, and the method 800 is operable to performed many times in sequence to detect another mode of operation if desired.

In view of the above detailed description of the present invention and associated drawings, other modifications and variations will now become apparent to those skilled in the art. It should also be apparent that such other modifications and variations may be effected without departing from the spirit and scope of the present invention.

What is claimed is:

1. A speaker-phone that performs adaptive filtering on a speech signal, the speaker-phone comprising:
   a main control circuitry;
   a first adaptive frequency dependent attenuation circuitry communicatively coupled to the main control circuitry that performs adaptive filtering on the first speech signal using a first attenuation parameter;
   a second adaptive frequency dependent attenuation circuitry communicatively coupled to the main control circuitry that performs adaptive filtering on the second speech using a second attenuation parameter.
   a mode detection circuitry that detects an operation mode of de speaker-phone from among a plurality of operation modes, the plurality of operation modes comprising a receive mode, a double talk mode, a transmit mode, and a silence mode; and
   a real time modification circuitry that operates cooperatively with the main control circuitry and the mode detection circuitry to adjust the first attenuation parameter and the second attenuation parameter in real time in accordance with a transfer function defined by:

$$|H(e^{j\Omega})|^2 = \frac{(1-a)^2}{1 - 2 \cdot a \cdot \cos(\Omega) + a^2}; 0 \le \Omega \le \pi.$$

2. The speaker-phone of claim 1, further comprising a real time modification circuitry that operates cooperatively with the main control circuitry and the mode detection circuitry to adjust the first attenuation parameter and e second attenuation parameter in real time;
   the real time modification circuitry comprises plurality of sliding coefficient sets, the first attenuation parameter and the second attenuation parameter are selected from the plurality of sliding coefficient sets, the selections of the first attenuation parameter and the second attenuation parameter are based, at least in part, on a characteristic of the first speech signal and a characteristic of the second speech signal.

3. The speakerphone of claim 1, wherein the first adaptive frequency dependent attenuation circuit adjusts the first attenuation parameter to a minimum predetermined value and the second adaptive frequency dependent attenuation circuitry adjusts the second attenuation parameter to a maximum predetermined value.

4. The speaker-phone of claim 1, wherein a sum comprising the first attenuation parameter and the second attenuation parameter exceeds a predetermined threshold.

5. The speaker-phone of claim 1, further comprising a real time modification circuitry that is communicatively coupled to the first adaptive frequency dependent attenuation circuitry and the second adaptive frequency dependent attenuation circuitry, the real time modification circuitry comprises a plurality of sliding coefficient sets, and
   a programmable sliding low pass filter that is communicatively coupled to the first adaptive frequency dependent attenuation circuitry and the second adaptive frequency dependent attenuation circuitry; and wherein the first attenuation parameter and the second attenuation parameter are selected from the plurality of sliding coefficient sets; and the real time modification circuitry exchanges a third attenuation parameter for the first attenuation parameter and exchanges a fourth attenuation parameter for the second attenuation parameter in real time, the third attenuation parameter and the fourth attenuation parameter are selected from the plurality of sliding coefficient sets.

6. The speaker-phone of claim 1, further comprising a double talk detection circuitry that is operable to detect the double talk mode.

7. A speaker-phone that performs adaptive filtering on a speech signal, the speaker-phone comprising:

a main control circuitry; and an adaptive frequency dependent attenuation circuitry communicatively coupled to the main control circuitry that operatives cooperatively with the main control circuitry to perform adaptive filtering on the speech signal using an attenuation parameter, the main control circuitry adjusts the attenuation parameter over a continuous range in accordance with a transfer function defined by:

$$|H(e^{j\Omega})|^2 = \frac{(1-a)^2}{1-2\cdot a\cdot \cos(\Omega)+a^2}; 0 \leq \Omega \leq \pi.$$

8. The speaker-phone of claim 7, further comprising a real time modification circuitry that comprises a plurality of sliding filter coefficient sets; and the main control circuitry is operable to select at least one of the plurality of sliding filter coefficient sets based on a characteristic of the speech signal.

9. The speaker-phone of claim 7, further comprising a real time modification circuitry that comprises a mode detection circuitry;

the main control circuitry uses information provided by the mode detection circuitry to adjust the adaptive filtering performed by the adaptive frequency dependent attenuation circuitry.

10. The speaker-phone of claim 7, wherein the speaker-phone is a full band analog speaker-phone; and the full band analog speaker-phone comprises a line echo canceller.

11. The speaker-phone of claim 7, further comprising a transmit circuitry and a receive circuitry; and the adaptive frequency dependent attenuation circuitry is distributed, at least in part between the transmit circuitry and the receive circuitry.

12. The speaker-phone of claim 7, further comprising a double talk detection circuitry that detects when at least two users of the speaker-phone are speaking; and the main control circuitry uses information provided by the double talk detection circuitry to perform an attenuation of the adaptive filtering that is performed by the adaptive frequency dependent attenuation circuitry in a predetermined manner.

13. The speaker-phone of claim 7, further comprising a double talk detection circuitry that detects when at least two users of the speaker-phone are speaking;

the adaptive frequency dependent attenuation circuitry performs adaptive filtering on the speech signal using the attenuation parameter and at least one additional attenuation parameter;

the main control circuitry uses information provided by the double talk detection circuit to modify the attenuation parameter by a constant fraction and to modify the at least one additional attenuation parameter by at least one additional constant fraction.

14. The speaker-phone of claim 13, wherein the constant fraction and the at least one additional constant fraction are the same constant fraction.

15. A method to perform adaptive frequency dependent attenuation on a speech signal in a speaker-phone, the method comprising:

detecting an operation mode of the speaker-phone from among a plurality of operation modes, the plurality of operation modes comprising a receive mode, a double talk mode, a transmit mode, and a silence mode;

identifying an attenuation parameter that is used to perform adaptive filtering on the speech signal;

determining whether the attenuation parameter has reached at least one of a predetermined maximum and a predetermined minimum; and modifying the attenuation parameter over a continuous range in accordance with a transfer function defined by $$|H(e^{j\Omega})|^2 = \frac{(1-a)^2}{1-2\cdot a\cdot \cos(\Omega)+a^2}; 0 \leq \Omega \leq \pi$$

when the attenuation parameter has not reached at least one of the predetermined maximum and the predetermined minimum.

16. The method of claim 15, further comprising:

identifying at least one additional attenuation parameter that is used to perform adaptive filtering on the speech signal; and adjusting the attenuation parameter to a minimum predetermined value and the at least one additional attenuation parameter to a maximum predetermined value based on the detected operation mode of the speaker-phone.

17. The method of claim 15, further comprising increasing the attenuation parameter by a predetermined fraction at a predetermined interval.

18. The method of claim 15, wherein the speaker-phone is a full band digital speaker-phone.

19. The method of claim 15, wherein the speaker-phone is a full band analog speaker-phone.

* * * * *

UNITED STATES PATENT AND TRADEMARK OFFICE
CERTIFICATE OF CORRECTION

PATENT NO.   : 6,795,547 B1
DATED        : September 21, 2004
INVENTOR(S)  : Elias Bjarnason It is certified that error appears in the above-identified patent and that said Letters Patent is hereby corrected as shown below:

<u>Column 12,</u>
Line 18, replace "the first speech" with -- a first speech --;
Lines 22-23, replace "the second speech" with -- a second speech signal --;
Line 25, replace "de speaker-phone" with -- the speaker-phone --;
Line 42, replace "and e second" with -- and the second --.

Signed and Sealed this

Twenty-eighth Day of June, 2005

JON W. DUDAS
*Director of the United States Patent and Trademark Office*